United States Patent
Mitra et al.

(10) Patent No.: US 11,900,799 B2
(45) Date of Patent: Feb. 13, 2024

(54) METHOD AND SYSTEM FOR REDUCING ROAD CONGESTION

(71) Applicant: Wipro Limited, Bangalore (IN)

(72) Inventors: Sumit Shovon Mitra, New Town (IN); Debasish Chanda, Maheshtala (IN)

(73) Assignee: Wipro Limited, Bangalore (IN)

( * ) Notice: Subject to any disclaimer, the term of this patent is extended or adjusted under 35 U.S.C. 154(b) by 294 days.

(21) Appl. No.: 16/795,927

(22) Filed: Feb. 20, 2020

(65) Prior Publication Data
US 2021/0201669 A1    Jul. 1, 2021

(30) Foreign Application Priority Data
Dec. 31, 2019   (IN) .............................. 201941054690

(51) Int. Cl.
*G08G 1/01*   (2006.01)
*G06N 20/00*  (2019.01)
(Continued)

(52) U.S. Cl.
CPC ......... *G08G 1/0145* (2013.01); *G05D 1/0291* (2013.01); *G06N 20/00* (2019.01);
(Continued)

(58) Field of Classification Search
None
See application file for complete search history.

(56) References Cited

U.S. PATENT DOCUMENTS

| | | | |
|---|---|---|---|
| 9,633,560 B1 | 4/2017 | Gao et al. | |
| 2008/0094250 A1* | 4/2008 | Myr | G08G 1/081 |
| | | | 340/909 |

(Continued)

FOREIGN PATENT DOCUMENTS

| | | |
|---|---|---|
| CN | 101266718 A | 9/2008 |
| CN | 102385804 A | 3/2012 |

(Continued)

OTHER PUBLICATIONS

European Search Report issued in the European Patent Office in European Application No. 20164370.7 dated Sep. 2, 2020. 12 pages.
(Continued)

*Primary Examiner* — Lail A Kleinman
(74) *Attorney, Agent, or Firm* — Finnegan, Henderson, Farabow, Garrett & Dunner LLP

(57) ABSTRACT

Disclosed herein is method and congestion management system for reducing road congestion. Traffic data related to plurality of vehicles is analyzed by a trained traffic model for predicting speed of each vehicle and signal time associated with intersection points. Optimal speed for each vehicle and an optimal signal time for each of the intersection points is determined based on analysis of the previous values and historic traffic data. The determined optimal speed and the optimal signal time are respectively provided to a vehicle control system associated with each vehicle and a traffic controller associated with each intersection point. In an embodiment, the method of present disclosure reduces traffic congestion on any selected portion of road. Further, the method of present disclosure eliminates and/or minimizes number of instances that a vehicle has to stop/start at the traffic signals, thereby enhancing fuel economy and reducing waiting time for the vehicles.

18 Claims, 4 Drawing Sheets

(51) Int. Cl.
G05D 1/02 (2020.01)
G08G 1/052 (2006.01)
G08G 1/0967 (2006.01)

(52) U.S. Cl.
CPC ......... *G08G 1/0116* (2013.01); *G08G 1/0129* (2013.01); *G08G 1/052* (2013.01); *G08G 1/096725* (2013.01)

(56) References Cited

U.S. PATENT DOCUMENTS

| | | |
|---|---|---|
| 2011/0173015 A1 | 7/2011 | Chapman et al. |
| 2014/0232561 A1 | 8/2014 | Musachio |
| 2016/0027301 A1 | 1/2016 | Publicover |
| 2017/0330456 A1* | 11/2017 | Miller .............. G08G 1/096758 |
| 2018/0190111 A1* | 7/2018 | Green .................. G08G 1/0133 |
| 2020/0294394 A1* | 9/2020 | Guo ................. G08G 1/096783 |

FOREIGN PATENT DOCUMENTS

| | | |
|---|---|---|
| CN | 105035090 B | 11/2015 |
| CN | 104192148 B | 9/2016 |
| WO | 2018001444 A1 | 1/2018 |
| WO | 2018001444 A9 | 1/2018 |
| WO | 2018125508 A1 | 7/2018 |
| WO | 2019127232 A1 | 7/2019 |

OTHER PUBLICATIONS

European Office Action dated Oct. 24, 2023 in EP Application No. 20164370.7 (7 pages).

* cited by examiner

METHOD AND SYSTEM FOR REDUCING ROAD CONGESTION

TECHNICAL FIELD

The present subject matter is, in general, related to traffic management and more particularly, but not exclusively, to method and system for reducing road congestion.

BACKGROUND

Currently, number of vehicles on road is increasing at a rapid rate and is resulting in increase of stress on the road infrastructure. Additionally, the increase in number of vehicles is also causing traffic congestion, especially in the developing countries. Traffic congestion is one of the major bottlenecks for the development. Thus, creating an appropriate road infrastructure for avoiding traffic congestion is important.

One of the main reasons for the traffic congestion is stoppage of vehicles at traffic signals. Frequent stoppage and starting of the vehicles disturbs the normal flow of the traffic and creates congestion at the traffic signals. As a general scenario, each time a vehicle stops at the traffic signal, the vehicle loses considerable travel time due to slow human reflex and creates lag and eventual congestion at the traffic signals. Also, frequent stoppage of the vehicles causes wastage of fuel and may even increase the pollution. Therefore, minimizing the stoppage at the traffic signals can greatly help in reducing the traffic congestion on the road.

There exist several methods for avoiding traffic congestion and managing movement of the vehicles through the traffic signals. However, the existing methods do not take into consideration critical parameters such as stoppage of vehicles at different parts of the road, the continuous adjustment of the vehicle speed, signal condition and timing of the traffic signals to reduce the number of times the vehicles have to stop/start at the traffic signals.

The information disclosed in this background of the disclosure section is only for enhancement of understanding of the general background of the invention and should not be taken as an acknowledgement or any form of suggestion that this information forms the prior art already known to a person skilled in the art.

SUMMARY

Disclosed herein is a method for reducing road congestion. The method comprises receiving, by a congestion management system, traffic data related to a plurality of vehicles moving on a selected path of a road from one or more sensors deployed along the selected path. Further, the method comprises predicting a speed of each of the plurality of vehicles at one or more predetermined intersection points along the selected path and a signal time associated with each of the one or more predetermined intersection points using a trained traffic model. The traffic model is trained using historic traffic data related to the plurality of vehicles. Subsequently, the method comprises determining an optimal speed for each of the plurality of vehicles and an optimal signal time for each of the one or more predetermined intersection points based on analysis of predicted speed and predicted signal time. Finally, the method comprises providing the optimal speed of each of the plurality of vehicles to a vehicle control system associated with corresponding each of the plurality of vehicles and the optimal signal time to a traffic controller associated with corresponding each of the one or more predetermined intersection points, thereby reducing the road congestion.

Further, the present disclosure relates to a congestion management system for reducing road congestion. The congestion management system comprises a processor and a memory. The memory is communicatively coupled to the processor and stores processor-executable instructions, which on execution, cause the processor to receive traffic data related to a plurality of vehicles moving on a selected path of a road, from one or more sensors deployed along the selected path. The instructions further cause the processor to predict a speed of each of the plurality of vehicles at one or more predetermined intersection points along the selected path and a signal time associated with each of the one or more predetermined intersection points using a trained traffic model. The traffic model is trained using historic traffic data related to the plurality of vehicles. Subsequently, the instructions cause the processor to determine an optimal speed for each of the plurality of vehicles and an optimal signal time for each of the one or more predetermined intersection points based on analysis of predicted speed and predicted signal time. Finally, the instructions cause the processor to provide the optimal speed of each of the plurality of vehicles to a vehicle control system associated with corresponding each of the plurality of vehicles and the optimal signal time to a traffic controller associated with corresponding each of the one or more predetermined intersection points, thereby reducing the road congestion.

Furthermore, the present disclosure relates to a non-transitory computer readable medium including instructions stored thereon that when processed by at least one processor cause a congestion management system to perform operations comprising receiving traffic data, related to a plurality of vehicles moving on a selected path of a road, from one or more sensors deployed along the selected path. Further, the instructions cause the congestion management system to predict a speed of each of the plurality of vehicles at one or more predetermined intersection points along the selected path and a signal time associated with each of the one or more predetermined intersection points using a trained traffic model. The traffic model is trained using historic traffic data related to the plurality of vehicles. Further, the instructions cause the congestion management system to determine an optimal speed for each of the plurality of vehicles and an optimal signal time for each of the one or more predetermined intersection points based on analysis of predicted speed and predicted signal time. Finally, the instructions cause the congestion management system to provide the optimal speed of each of the plurality of vehicles to a vehicle control system associated with corresponding each of the plurality of vehicles and the optimal signal time to a traffic controller associated with corresponding each of the one or more predetermined intersection points, thereby reducing the road congestion.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF ACCOMPANYING DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which:

Figure 1:
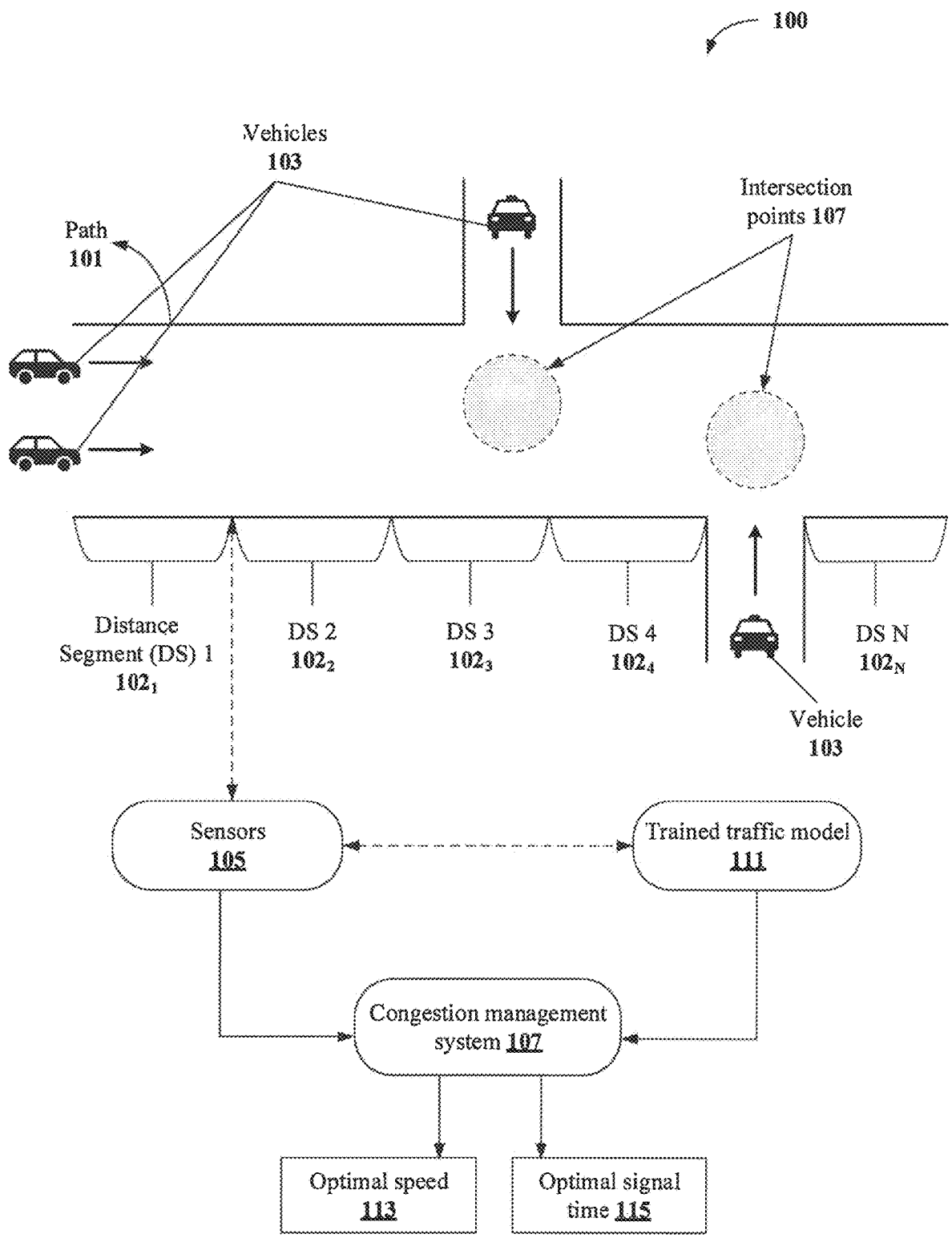
FIG. 1 illustrates an exemplary environment for reducing road congestion in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the scope of the disclosure.

The terms "comprises", "comprising", "includes", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to method and congestion management system for reducing road congestion. In an embodiment, the present disclosure provides a mechanism to create a virtual green corridor and/or a signal-free path for the vehicles to prevent any stoppage of vehicles within a selected stretch of the road and subsequently creating a better traffic flow. Accordingly, the present disclosure discloses collecting traffic data from different edge sensors deployed in the selected stretch of the road and then processing the collected traffic data to create an appropriate traffic plan for the vehicles moving through the selected stretch of the road. The traffic plan is configured with an adaptable signalling timer and machine learning analytics to continuously adjust speed of the vehicle and the signal time. Further, the determined variable speed limit and the signal time are communicated to the vehicles within the selected path for controlling the congestion on the selected path.

In an embodiment, the method of present disclosure helps in reducing traffic congestion on any selected portion of the road. Additionally, the method of present disclosure helps in eliminating and/or minimizing the number of instances that the vehicles have to stop/start at the traffic signals, thereby enhancing fuel economy and reducing waiting time for the vehicles. Further, the method of present disclosure also helps in designing a traffic-free and/or zero traffic green corridor for smooth, congestion-less movement of the vehicles by designing an appropriate plan for the selected path.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 illustrates an exemplary environment 100 for reducing road congestion in accordance with some embodiments of the present disclosure.

In an embodiment, the environment 100 may include, without limiting to, a selected path 101, a plurality of vehicles 103 moving on the selected path 101, one or more sensors 105 deployed on the path 101, a congestion management system 109 and a trained traffic model 111 associated with the path 101.

In an embodiment, the path 101 may be a smaller portion of a road selected for reducing the congestion. Generally, the road may consist of multiple paths and each path may, in turn, consist of multiple distance segments 102 namely, distance segment 1 $102_1$ to distance segment 2 $102_N$ (collectively referred as distance segments 102) and one or more predetermined intersection points 107. In an embodiment, the path 101 may be bi-directional, that is, having both an upward traffic flow and a downward traffic flow. Further, each distance segment 102 of the path 101 may be deployed with multiple sensors 105 to collect various dynamic and static information related to the path 101. As an example, the one or more sensors 105 that are deployed on the path 101 may include, without limiting to, an entry sensor, an exist sensor, an intermediate edge sensor and a display unit. The entry sensor may be configured to monitor and report number of vehicles 103 entering the path 101. Similarly, the exit sensor may be configured to monitor and report number of vehicles 103 exiting the path 101. The intermediate edge sensor may be used to monitor and report events such as traffic incidents occurring in the path 101, stoppage of vehicles 103 in the path 101 and the like. The display unit may be used for displaying and/or providing real-time information and recommendations to drivers of the plurality of vehicles 103 moving through the path 101.

In an embodiment, the plurality of vehicles 103 may include, for example, cars, busses, trucks, motorcycles and the like. In an implementation, the plurality of vehicles 103 may also include autonomous and/or driverless vehicles 103.

In an embodiment, the congestion management system 109 may be any computing system including, without limiting to, a desktop computer, a laptop, a smartphone or a server, which is capable of being configured to reduce road congestion as per embodiments of the present disclosure. In an implementation, the congestion management system 109 may be operated from a remote location and configured to dynamically exchange information such as traffic data with the one or more sensors 105 and the trained traffic model 111.

In an embodiment, the trained traffic model 111 may be a machine learning model, which is trained with historic traffic data 211 related to the path 101 for predicting a speed of each of the plurality of vehicles 103 passing through the path 101 and signal time associated with each of the one or more predetermined intersection points 107 on the path 101. Further, the trained traffic model 111 may be configured to dynamically analyse and learn any deviations between the predicted values of the speed and signal time to the actual values of the speed and signal time.

In an embodiment, for reducing the road congestion over the path 101, it may be necessary to minimize and/or eliminate vehicle stop/start process within the path 101. Further, to minimize the vehicle stop/start process, it may be important to ensure that there is no congestion at the one or more predetermined intersection points 107. This may be met by adaptively controlling the speed of each of the plurality of vehicles 103 and dynamically varying the signal time at the one or more predetermined intersection points 107. Therefore, an optimal speed 113 and an optimal signal time 115 must be continuously determined and provided to respective controlling mechanisms for reducing the congestion on the path 101.

In an embodiment, in order to achieve the objective as illustrated above, the congestion management system 109 may be configured for receiving traffic data (also referred as real-time traffic data) related to the plurality of vehicles 103 moving on the path 101 from, one or more sensors 105 deployed along the path 101. As an example, the traffic data may include, without limiting to, a current location of each of the plurality of vehicles 103, weather condition across the path 101, information of any incidents reported on the path 101, a current speed of the plurality of vehicles 103, current signal condition and signal timing, number of vehicles 103 entering and crossing the path 101, number of vehicles 103 waiting at the traffic signal and the like.

In an embodiment, upon receiving the traffic data, the congestion management system 109 may predict the speed of each of the plurality of vehicles 103 at one or more predetermined intersection points 107 and the signal time associated with each of the one or more predetermined intersection points 107 using the trained traffic model 111. Here, the trained traffic model 111 uses the real-time traffic data of the path 101 and predicts possible values of the speed of vehicles 103 and the signal time in the path 101.

In an embodiment, subsequent to predicting the speed and the signal time, the congestion management system 109 may determine an optimal speed 113 for each of the plurality of vehicles 103 and an optimal signal time 115 for each of the one or more predetermined intersection points 107 based on an analysis of the predicted speed and the predicted signal time values. In some implementations, the predicted speed and the predicted signal time may be analysed using at least one of a multivariate linear regression model or a re-enforcement learning model.

In an embodiment, once the optimal speed 113 and the optimal signal time 115 are determined, the congestion management system 109 may provide the values of the optimal speed 113 and the optimal signal time 115 to respective control mechanisms to ensure that movement of each of the plurality of vehicles 103 in the path 101 is controlled according to the optimal speed 113 and the optimal signal time 115. In an implementation, the optimal speed 113 may be communicated to drivers of the plurality of vehicles 103 by means of a suitable audio and/or visual notification. Similarly, the optimal signal time 115 may be communicated to a traffic controller associated with corresponding each of the one or more predetermined intersection points 107.

In an embodiment, the congestion management system 109 may continuously determine the optimal speed 113 and the optimal signal time 115 at predetermined regular intervals, for example, once in every one second to ensure that the path 101 is maintained in a congestion-free state at any point of time. In an alternative embodiment, determination of the optimal speed 113 and the optimal signal time 115 may be dynamically triggered only when a congestion is detected on the path 101 and/or on the one or more predetermined intersection points 107.

Figure 2:
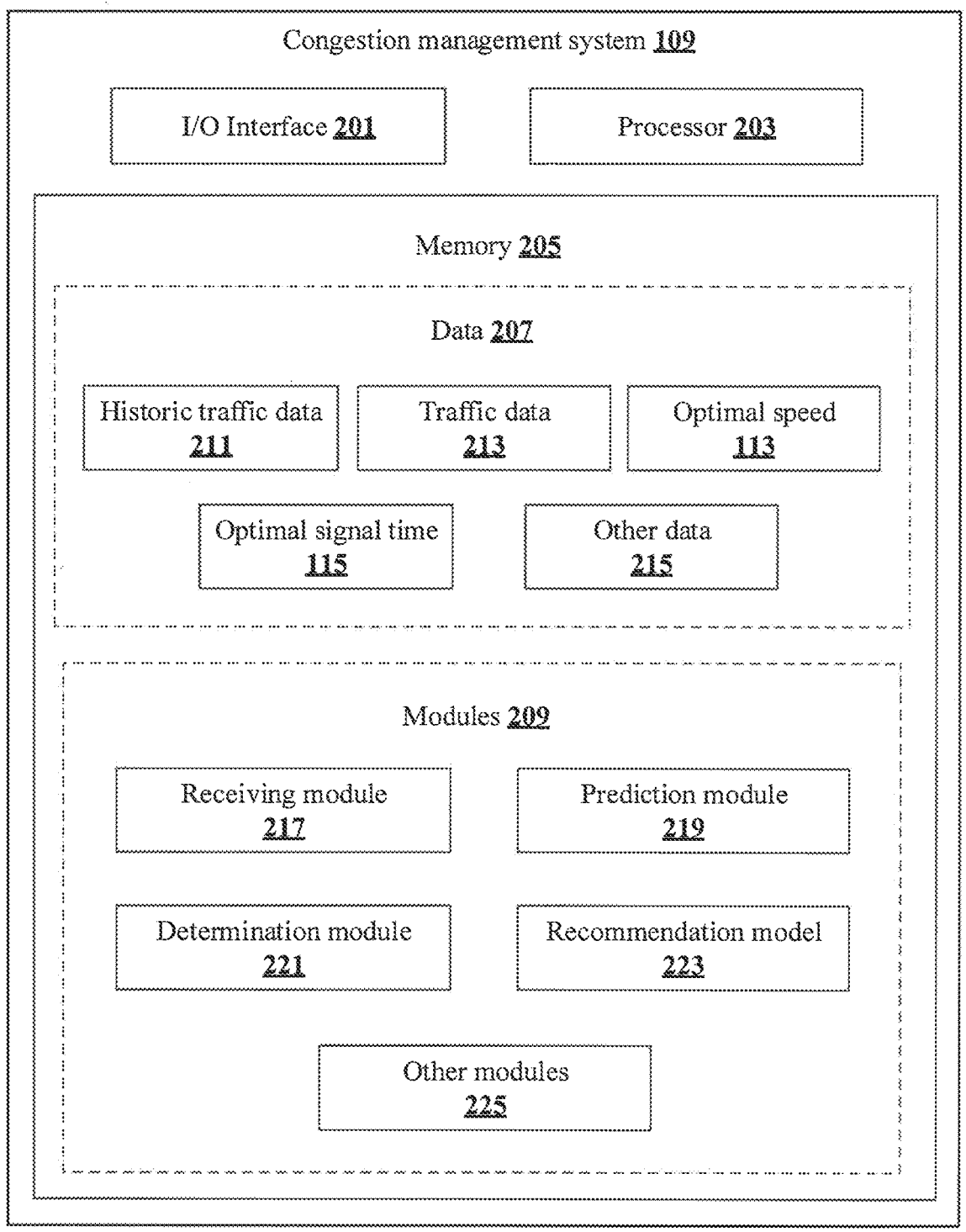
FIG. 2 shows a detailed block diagram of a congestion management system in accordance with some embodiments of the present disclosure.

FIG. 2 shows a detailed block diagram of a congestion management system 109 in accordance with some embodiments of the present disclosure.

In some implementations, the congestion management system 109 may include an I/O interface 201, a processor 203 and a memory 205. The I/O interface 201 may be communicatively interfaced with one or more sensors 105 deployed on a selected path 101 of a road for receiving traffic data 213 related to a plurality of vehicles 103 moving through the selected path 101. Further, the I/O interface 201 may be interfaced with a trained traffic model 111 for obtaining optimal values of speed of the plurality of vehicles 103 and an optimal value of signal time. The memory 205 may be communicatively coupled to the processor 203 and may store data 207 and one or more modules 209. The processor 203 may be configured to perform one or more functions of the congestion management system 109 for reducing road congestion, using the data 207 and the one or more modules 209.

In an embodiment, the data 207 may include, without limitation, historic traffic data 211, traffic data 213, optimal speed 113, optimal signal time 115 and other data 215. In some implementations, the data 207 may be stored within the memory 205 in the form of various data structures. Additionally, the data 207 may be organized using data models, such as relational or hierarchical data models. The other data 221 may store various temporary data and files generated by one or more modules 209 while performing various functions of the congestion management system 109. As an example, the other data 221 may include, without limiting to, dimensions of the road, real-time weather information from surrounding of the road and the like.

In an embodiment, the historic traffic data 211 may be the data related to the path 101 and the plurality of vehicles 103 moving on the path 101 collected over a period of time. As an example, the traffic data 213 collected over a period of 6-months may be considered as the historic traffic data 211 for the path 101. In an embodiment, the historic traffic data 211 may be used for training the traffic model 111 for predicting the speed and the signal time values.

In an embodiment, the traffic data 213 or the real-time traffic data 213 may be the real-time traffic data 213 collected by the one or more sensors 105 deployed in the path 101. The traffic data 213 may be used for determining the optimal speed 113 and the optimal signal time 115 for the plurality of vehicles 103 moving on the path 101. As an example, the traffic data 213 may include, without limiting to, number of vehicles 103 moving on the path 101, length of the path 101, current speed of the plurality of vehicles 103 and the signal wait/open time at the predetermined intersection points 107 on the path 101. In an embodiment, the real-time traffic data 213 may be dynamically collected at predetermined regular intervals such as, for example, 1 second.

In an embodiment, the optimal speed 113 may be a minimum speed range that has to be maintained by each of the plurality of vehicles 103, to ensure that the plurality of vehicles 103 do not form a congestion at the one or more intersection points 107 or elsewhere on the path 101. In other words, the optimal speed 113 may be a target speed for the plurality of vehicles 103, while the plurality of vehicles 103 are moving on the path 101. In an implementation, value of the optimal speed 113 may be different for one or more vehicles 103 of the plurality of vehicles 103, such that, each of the plurality of vehicles 103 do not arrive at the one or more intersection points 107 at the same time, thus avoiding congestion at the one or more intersection points 107.

In an embodiment, the optimal signal time 115 may be an ideal signal wait and/or open time that needs to be maintained for avoiding congestion at the one or more intersection points 107. The optimal signal time 115 ensures that a maximum number of vehicles 103 are allowed to cross the signals with no or very minimal waiting at the one or more intersection points 107. Since controlling the speed of the vehicles 103 alone may not be effective in reducing the congestion, especially during a dense traffic condition, maintaining the optimal signal time 115 at the one or more intersection points 107 becomes crucial for reducing the congestion.

In an embodiment, the data 207 may be processed by the one or more modules 209. In some implementations, the one or more modules 209 may be communicatively coupled to the processor 203 for performing one or more functions of the congestion management system 109. In an implementation, the one or more modules 209 may include, without limiting to, a receiving module 217, a prediction module 219, a determination module 221, a recommendation module 223 and other modules 225.

As used herein, the term module refers to an Application Specific Integrated Circuit (ASIC), an electronic circuit, a hardware processor (shared, dedicated, or group) and memory that execute one or more software or firmware programs, a combinational logic circuit, and/or other suitable components that provide the described functionality. In an embodiment, the other modules 233 may be used to perform various miscellaneous functionalities of the congestion management system 109. It will be appreciated that such one or more modules 209 may be represented as a single module or a combination of different modules.

In an embodiment, the receiving module 217 may be configured for receiving the traffic data 213 from the one or more sensors 105 deployed along the selected path 101. In an embodiment, the one or more sensors 105 may collect relevant traffic data 213 from the one or more intersection points 107 and the distance segments 102 comprised in the selected path 101. Further, one or more intermediate edge sensors 105 may collect various information regarding the traffic entering the selected path 101 and the traffic moving out of the selected path 101. In an embodiment, the receiving module 217 may collect the traffic data 213 relating to both directions of the traffic flow, that is, the upward traffic movement and the downward traffic movement. Table A below shows exemplary traffic data 213 that may be collected from the one or more sensors 105 deployed on the selected path 101.

TABLE A

Exemplary traffic data

| Time window | #Car release window start | Time of 1$^{st}$ car touching DS1 | Time of last car exiting DS1 | Optimal entry speed for DS1 | Time of 1$^{st}$ car touching DS2 | Time of last car exiting DS2 | Optimal entry speed for DS2 | Time of 1$^{st}$ car touching intersection C1 | Time of last car exiting C1 | No. of cars at C1 | Signal time for C1 |
|---|---|---|---|---|---|---|---|---|---|---|---|
| 8-8:05 AM | 60 Sec | 8:02:04 AM | 8:04:20 AM | 40 Km/Hr | 8:04:20 AM | 8:05:20 AM | 25 Km/Hr | 8:03:10 AM | 8:06:25 AM | 45 | 125 Sec |

In an embodiment, upon collecting the traffic data 213, the receiving module 217 may analyze and process the traffic data 213 before using the traffic data 213 for further processing. As an example, data processing operations such as data normalization, data enrichment and refinement may be performed on the collected traffic data 213 before the traffic data 213 is further analyzed. Additionally, the processed traffic data 213 may be stored in a reference database and may be used for training of the traffic model 111.

In an embodiment, the receiving module 217 may collect the traffic data 213 at predefined time units. As an example, the time unit may be 1 second, which means that the traffic data 213 is collected once in every second. Further, the series of traffic data 213 received at each of the time units may be serialized and stored in the reference database for future reference. In an embodiment, there may be a higher granularity and better control over the collected traffic data 213 when the time unit is a smaller.

In an embodiment, the collected traffic data 213 may be checked for errors by comparing the collected traffic data 213 with reference traffic data 213 collected from both a normal traffic condition (i.e. without specifically selecting a path 101) and a controlled traffic condition (i.e. when the vehicles 103 are moving in the optimal speed 113 and the optimal signal time 115 is set). The above comparison helps in training of the traffic model 111 and also prepares the traffic model 111 to respond to various situations quickly.

In an embodiment, the prediction module 219 may be configured for predicting the speed of each of the plurality of vehicles 103 at one or more predetermined intersection points 107 and the signal time associated with each of the one or more predetermined intersection points 107 using a trained traffic model 111.

In an embodiment, the prediction module 219 may employ a two-step multivariate regression analysis method on the collected traffic data 213 to predict the signal time at an intersection point at 'M' ($IC_M$), at time 'T' as $PSICT_M$, wherein:

$PSICT_M = \{T_S\text{:start Time}, T_E\text{:end Time}, S\text{:Signal state}, EVS\text{:Expected Vehicle speed at signal}\}$ Additionally, the prediction module 219 may predict the speed and the signal state for a Distance Segment (DS) 102 within the path 101. As an example, the predicted values for the Path ($P_p$) at distance segment $DS_K^u$ and time 'T' may be defined as $PTDSV_{k_p}^u$, wherein:

$$PTDSV_{k_p}^u = \{T_S\text{:start Time},T_E\text{:end Time},S\text{:Signal state},OEVS\text{:Overall Expected Vehicle speed during the Segment},\{EVS\text{:Expected vehicle speed at each sub-segment}\}$$

Further, a prediction function may be created after performing the two-step regression multivariate analysis of the collected traffic data 213. In an embodiment, the serialized traffic data 213 collected at a series of time units may be represented as $DSVT_n^u$ and $ICVT_n^l$, such that:

$$DSVT_n^u = \{(t_1,DSVT_{n_1}^u),(t_2,DSVT_{n_3}^u),(t_3,DSVT_{n_3}^u),\ldots\}$$

$$ICVT_n^l = \{(t_1,ICVT_{n_1}^l),(t_2,ICVT_{n_2}^l),(t_3,ICVT_{n_3}^l)\ldots\}$$

Here, each data point may have location information of a specific DS and Intersection point (IC). Also, each feature set may consist of time, location and the various parameters as defined in $ICV_n^l$ and $DSV_n^u$ above. Further, a multivariate analysis may be performed on the above feature sets for obtaining the final feature sets. As an example, the multivariate analysis may include operations such as 'dimensionality reduction', 'variable selection', and 'multivariate regression analysis', which help in identifying the correct parameters useful for performing the linier regression.

As an example, after analyzing the feature sets, if the final feature set may be as defined as $X_i$, for each time series, the output prediction may be defined as $PSICT_M$ for an intersection point 'M'. Further, the predicted outcome may be defined as $Y_i$ for the input $X_i$. Subsequently, once sufficient data set has been collected, the linier regression may be performed. As an example, the linier regression function may be defined by equation (1) below:

$$Y_i = A + BX_i \quad (1)$$

In an embodiment, initially, the traffic model 111 may be trained with global data. Subsequently, the traffic model 111 may be fine-tuned with the local data within the selected path 101, having an intersection point 'M'. This may be defined as shown in equation (2) below:

$$Y_i^{PM} = A + BX_i^{PM} \quad (2)$$

In an embodiment, the traffic model 111 defined in the equation (2) may be deployed for generating results including the optimal speed 113 and the optimal signal time 115 and to make a comparison with actual values of the vehicle speed and the signal time. In an embodiment, if the deviation between the generated optimal values and the actual values is more than a threshold, then the traffic model 111 may be re-trained until accurate results are obtained.

Thus, a final traffic model 111 for a path 'P' having an intersection point 'M' may be defined as shown in equation (3) below:

$$PSICT_N = F_{PredictICP}(\text{Path}(DSVT_n^u, ICVT_n^l),T) \quad (3)$$

Thereafter, from the output of the equation (3) above, a subsequent multivariate regression may be performed with freshly predicted values of the speed and signal time.

Finally, a final traffic model 111 for the entire path 'P' may be defined as shown in equation (4) below:

$$PTDSV_{k_p}^u = F_{PredictDSP}(DSVT_n^u, PSICT_N, T) \quad (4)$$

In an embodiment, there may be multiple distance segments 102 between two intersection points 107 of the selected path 101. However, the same multivariate linear regression may be used for predicting the speed and the signal time information across each distance segments 102. Alternatively, a re-enforcement learning algorithm with greedy policy may be used for predicting the speed and the signal time information. In the case of re-enforcement learning, the system may perform exploration/exploitation trade off and learn to predict the speed and the signal information.

In an embodiment, the determination module 221 may be configured for determining the optimal speed 113 for each of the plurality of vehicles 103 and the optimal signal time 115 for each of the one or more predetermined intersection points 107 based on analysis of the predicted speed and the predicted signal time.

In an embodiment, once the final traffic model 111 is trained and deployed according to the traffic plan defined for the selected path 101, the real-time traffic data 213 may be collected from the one or more sensors 105 deployed on the selected path 101, and relevant information including the predicted speed and the predicted signal time may be used for determining the optimal speed 113 and the optimal signal time 115. In an embodiment, the determination module 221 may estimate the optimal speed 113 and the optimal signal time 115 based on the functions $F_{PredictIC}$ and $F_{PredictDS}$ (as illustrated above), which generated and finalized during the learning phase of the traffic model 111.

In an embodiment, the recommendation module 223 may be configured for providing the optimal speed 113 of each of the plurality of vehicles 103 to a vehicle control system associated with corresponding each of the plurality of vehicles 103. Additionally, the recommendation module 223 may be configured for providing the optimal signal time 115 to a traffic controller associated with corresponding each of the one or more predetermined intersection points 107 for reducing the road congestion.

In an embodiment, the optimal speed 113 and the optimal signal time 115 may be transmitted to intermediate edge sensors 105 and display units associated with the path 101 for notifying the drivers of the plurality of vehicles 103. Additionally, the optimal speed 113 and the optimal signal time 115 may be transmitted to an in-vehicle edge system configured in the plurality of vehicles 103, moving within the selected path 101 based on help of real-time location of the plurality of vehicles 103.

In an embodiment, the optimal speed 113 and the optimal signal time 115 may be compared with the predicted values of the speed and the signal time. Further, when the plurality of vehicles 103 progress through various distance segments 102 within the selected path 101, any deviation from the original prediction may be captured and values of the signal time and the speed may be dynamically re-adjusted. In an embodiment, if extra time is needed, priority may be given to the vehicles 103 moving in the selected path 101, by increasing the signal time to ensure that all the vehicles 103 move out of the selected path 101 without causing the congestion.

In case there a possibility of halt and/or stoppage of a vehicle at a traffic signals, such vehicle may be stopped before the intersection points 107, in-between the two distance segments 102 ($DS_r^u$, $DS_{r+1}^u$) within the selected path 101. Further, when it is time to open the signal at the intersection point, a few time slots earlier to the $DS_{r+1}^u$ and after the $DS_r^u$ may be activated. As a result, when the vehicle that had stopped before the intersection points 107 arrives at the intersection point, the signal may be turned green/open, thereby allowing the vehicle to pass through the signal.

Consequently, the vehicles 103 that are in motion/moving condition may clear the intersection points 107 much efficiently.

In an embodiment, each of the plurality of vehicles 103 moving on the selected path 101 may get information related to the speed at which they must move, and information of stop points in-between the intersection points 107, if needed. Consequently, the plurality of vehicles 103 driving through the selected path 101 may experience no stoppage of traffic along the selected path 101, which in turn, reduces the congestion at the traffic signals and avoids the start/stop or idling of the vehicles 103 in the signal. In other words, the controlling the movement of the plurality of vehicles 103 according to the optimal speed 113 and the optimal signal time 115 may help to achieve less congestion at the traffic signals, avoids dead-stop of the vehicles 103 and hence improves momentum of the traffic flow. This also helps in reducing wastage of fuel and reduces pollution at the traffic signals.

In the current scenario, the traffic data 213 may be collected from the one or more sensors 105 deployed on the selected path 101. In an alternative embodiment, in the scenario of connected vehicle system, the traffic data 213 may be collected directly from the vehicles 103 to perform the similar activity, without the requirement of implementing the sensors 105 along the path 101. Additionally, it may be also possible to send the speed and other driving information directly to the vehicle, without the requirement of any display units.

Figure 3:
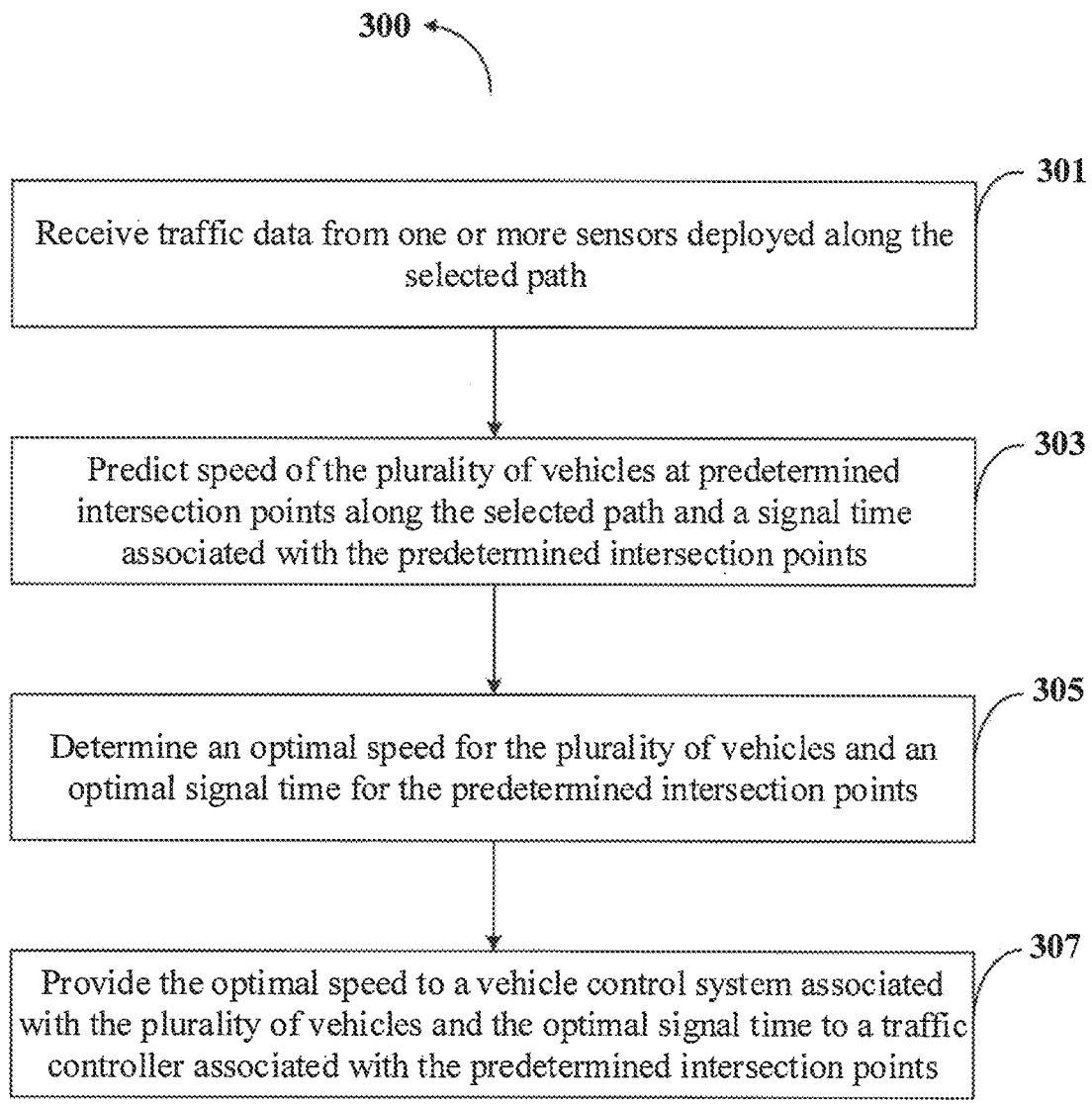
FIG. 3 shows a flowchart illustrating a method of reducing road congestion in accordance with some embodiments of the present disclosure.

FIG. 3 shows a flowchart illustrating a method of reducing road congestion in accordance with some embodiments of the present disclosure.

As illustrated in FIG. 3, the method 300 may include one or more blocks illustrating a method for reducing road congestion using a congestion management system 109 illustrated in FIG. 1. The method 300 may be described in the general context of computer executable instructions. Generally, computer executable instructions can include routines, programs, objects, components, data structures, procedures, modules, and functions, which perform specific functions or implement specific abstract data types.

The order in which the method 300 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 301, the method 300 includes receiving, by the congestion management system 109, traffic data 213 related to a plurality of vehicles 103 moving on a selected path 101 of a road from one or more sensors 105 deployed along the selected path 101. In an embodiment, selecting the path 101 for deploying the one or more sensors 105 may include identifying one or more distance segments 102 and one or more intersection points 107 along the path 101. In one implementation, the one or more distance segments 102 may be configured with at least one of the one or more sensors 105 including an entry sensor, an exist sensor, an intermediate edge sensor and a display unit.

At block 303, the method 300 includes predicting, by the congestion management system 109, a speed of each of the plurality of vehicles 103 at one or more predetermined intersection points 107 along the selected path 101 and a signal time associated with each of the one or more predetermined intersection points 107 using a trained traffic model 111. In an embodiment, the traffic model 111 may be trained using historic traffic data 211 related to the plurality of vehicles 103. As an example, the historic traffic data 211 may include, without limiting to, at least one of number of vehicles 103 moving on the path 101, length of the path 101, speed of the plurality of vehicles 103 and the signal time of predetermined intersection points 107 along the path 101.

At block 305, the method 300 includes determining, by the congestion management system 109, an optimal speed 113 for each of the plurality of vehicles 103 and an optimal signal time 115 for each of the one or more predetermined intersection points 107 based on analysis of predicted speed and predicted signal time. In an embodiment, the optimal speed 113 of each of the plurality of vehicles 103 and the optimal signal time 115 of each of the one or more predetermined intersection points 107 may be provided to the traffic model 111 for re-training of the traffic model 111.

At block 307, the method 300 includes providing, by the congestion management system 109, the optimal speed 113 of each of the plurality of vehicles 103 to a vehicle control system associated with corresponding each of the plurality of vehicles 103 and the optimal signal time 115 to a traffic controller associated with corresponding each of the one or more predetermined intersection points 107 for reducing the road congestion. In an embodiment, the road congestion may be reduced by controlling each of the plurality of vehicles 103 in the optimal speed 113 corresponding to each of the plurality of vehicles 103. In addition, each of the one or more predetermined intersection points 107 may be maintained in the optimal signal time 115 for reducing the congestion at the traffic.

In an embodiment, value of the optimal speed 113 for the plurality of vehicles 103 may be provided to a driver of corresponding each of the plurality of vehicles 103, using at least one of an audio notification or a visual notification when the plurality of vehicles 103 are on the selected path 101.

In an embodiment, the predicted speed and the predicted signal time may be analysed using at least one of a multivariate linear regression model or a re-enforcement learning model. Further, the optimal speed 113 and the optimal signal time 115 may be determined at predetermined intervals or upon detecting a congestion in the one or more intersection points 107.

Computer System

Figure 4:
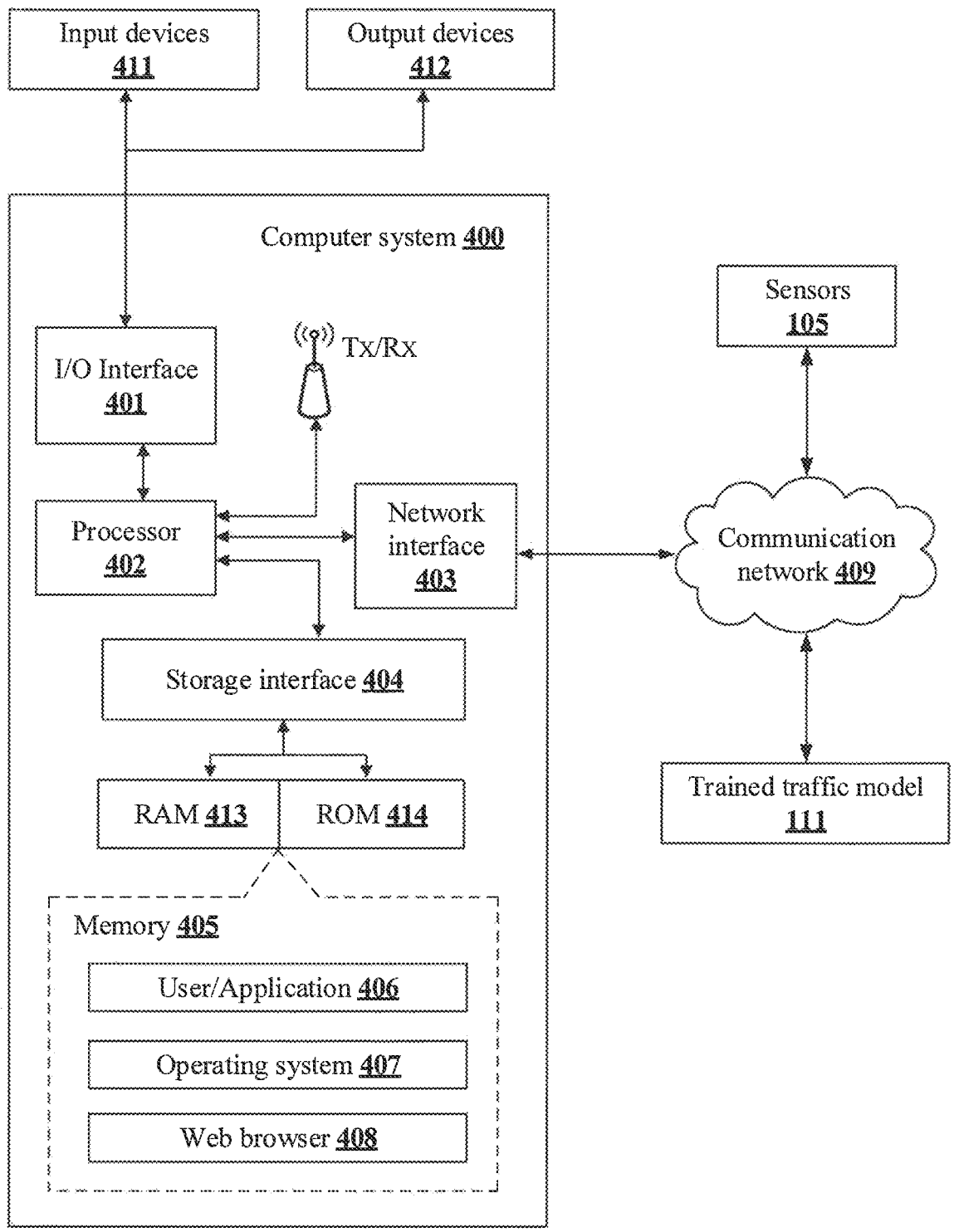
FIG. 4 illustrates a block diagram of an exemplary computer system for implementing embodiments consistent with the present disclosure.

FIG. 4 illustrates a block diagram of an exemplary computer system 400 for implementing embodiments consistent with the present disclosure. In an embodiment, the computer system 400 may be the congestion management system 109 illustrated in FIG. 1, which may be used for reducing road congestion. The computer system 400 may include a central processing unit ("CPU" or "processor") 402. The processor 402 may comprise at least one data processor for executing program components for executing user- or system-generated business processes. A user may include a person, a traffic police, a driver, an organization or any system/subsystem being operated parallelly to the computer system 400. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE®-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE® 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc. Using the I/O interface 401, the computer system 400 may communicate with one or more I/O devices 411 and 412.

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE® 802.11 a/b/g/n/x, etc. Using the network interface 403 and the communication network 409, the computer system 400 may communicate with the one or more sensors 105 for receiving traffic data 213 related to a plurality of vehicles 103 moving on a selected path 101 of the road. Additionally, the computer system 400 may communicate with a trained traffic model 111 that predicts the speed of the plurality of vehicles 103 and a signal time associated with each of one or more predetermined intersection points 107.

In an implementation, the communication network 409 may be implemented as one of the several types of networks, such as intranet or Local Area Network (LAN) and such within the organization. The communication network 409 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc.

In some embodiments, the processor 402 may be disposed in communication with a memory 405 (e.g., RAM 413, ROM 414, etc. as shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user/application interface 406, an operating system 407, a web browser 408, and the like. In some embodiments, computer system 400 may store user/application data 406, such as the data, variables, records, etc. as described in this invention. Such databases may be implemented as fault-tolerant, relational, scalable, secure databases such as Oracle® or Sybase®.

The operating system 407 may facilitate resource management and operation of the computer system 400. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM® OS/2®, MICROSOFT® WINDOWS® (XP®, VISTA®/7/8, 10 etc.), APPLE® IOS®, GOOGLE™ ANDROID™, BLACKBERRY® OS, or the like.

The user interface 406 may facilitate display, execution, interaction, manipulation, or operation of program components through textual or graphical facilities. For example, the user interface 406 may provide computer interaction interface elements on a display system operatively connected to the computer system 400, such as cursors, icons, check boxes, menus, scrollers, windows, widgets, and the like. Further, Graphical User Interfaces (GUIs) may be employed, including, without limitation, APPLE® MACINTOSH® operating systems' Aqua®, IBM® OS/2®, MICROSOFT® WINDOWS® (e.g., Aero, Metro, etc.), web interface libraries (e.g., ActiveX®, JAVA®, JAVASCRIPT®, AJAX, HTML, ADOBE® FLASH®, etc.), or the like.

The web browser 408 may be a hypertext viewing application. Secure web browsing may be provided using Secure Hypertext Transport Protocol (HTTPS), Secure Sockets Layer (SSL), Transport Layer Security (TLS), and the like. The web browsers 408 may utilize facilities such as AJAX, DHTML, ADOBE® FLASH®, JAVASCRIPT®, JAVA®, Application Programming Interfaces (APIs), and the like. Further, the computer system 400 may implement a mail server stored program component. The mail server may utilize facilities such as ASP, ACTIVEX®, ANSI® C++/C#, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 400 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, and the like.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the embodiments of the present disclosure are illustrated herein.

In an embodiment, the method of present disclosure helps in reducing traffic congestion on any selected portion of the road.

In an embodiment, the method of present disclosure eliminates and/or minimizes the number of instances that the vehicles have to stop/start at the traffic signals, thereby enhancing fuel economy and reducing waiting time for the vehicles.

In an embodiment, the method of present disclosure helps in designing a traffic-free and/or zero traffic green corridor for smooth, congestion-less movement of the vehicles by designing an appropriate plan for the selected path.

The method and system disclosed in the present disclosure may be used to overcome a technical problem of traffic congestion on roads. Specifically, the method and system disclosed herein aim to avoid/reduce traffic stoppage at traffic signals on the road, since the traffic stoppage, more often, disturbs the regular flow of the traffic and creates congestion at the traffic signals. Additionally, the disclosed method and system aim to eliminate other inherent drawbacks of traffic stoppage including: wastage of time due to human reflex lag during start/stop of vehicles, wastage of fuel due to repeated engine start/stop operation, increases pollution and the like. In other words, the disclosed method and system have a practical application and provide a technically advanced solution to the technical problem of avoiding traffic congestion.

The aforesaid technical advancement and practical application of the disclosed method and system may be attributed to the aspect of determining: a) an optimal speed for each of the plurality of vehicles and b) an optimal signal time for each intersection points, as disclosed in the 'determining' step of claims 1 and 10 of the disclosure.

In light of the technical advancements provided by the disclosed method and system, the claimed steps, as discussed above, are not routine, conventional, or well-known aspects in the art, as the claimed steps provide the aforesaid solutions to the technical problems existing in the conventional technologies. Further, the claimed steps clearly bring an improvement in the functioning of the system itself, as the claimed steps provide a technical solution to a technical problem.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all the items are mutually exclusive, unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Environment |
| 101 | Path |
| 102 | Distance segments |
| 103 | Vehicles |
| 105 | Sensors |
| 107 | Intersection points |
| 109 | Congestion management system |
| 111 | Trained traffic model |
| 113 | Optimal speed |
| 115 | Optimal signal time |
| 201 | I/O interface |
| 203 | Processor |
| 205 | Memory |
| 207 | Data |
| 209 | Modules |
| 211 | Historic traffic data |
| 213 | Traffic data |
| 215 | Other data |
| 217 | Receiving module |
| 219 | Prediction module |
| 221 | Determination module |
| 223 | Recommendation module |
| 225 | Other modules |
| 400 | Exemplary computer system |
| 401 | I/O Interface of the exemplary computer system |
| 402 | Processor of the exemplary computer system |
| 403 | Network interface |
| 404 | Storage interface |
| 405 | Memory of the exemplary computer system |
| 406 | User/Application |
| 407 | Operating system |
| 408 | Web browser |
| 409 | Communication network |
| 411 | Input devices |
| 412 | Output devices |
| 413 | RAM |
| 414 | ROM |

What is claimed is:

1. A method for reducing road congestion, the method comprising:

selecting, by a congestion management system, a path by identifying one or more distance segments and one or more predetermined intersection points along a selected stretch of a road, wherein the selected path is indicative of a signal-free path without any stoppage of the plurality of vehicles within the selected stretch of the road;

receiving, by the congestion management system, traffic data related to a plurality of vehicles, for each distance segment and each predetermined intersection point on the selected path of the road, from one or more sensors deployed along the selected path,
  wherein, for each distance segment and each predetermined intersection point,
    the traffic data comprises current location of each vehicle, current speed of each vehicle, number of vehicles entering and crossing the selected path, current signal condition and signal timing at the one or more predetermined intersection points, and number of vehicles waiting at the one or more predetermined intersection points;
predicting, by the congestion management system, a speed of each of the plurality of vehicles across each distance segment within the selected path and a signal time associated with each of the one or more predetermined intersection points, based on the traffic data using a trained traffic model,
  wherein the traffic model is trained using historic traffic data related to the plurality of vehicles;
determining, by the congestion management system, an optimal speed for each of the plurality of vehicles and an optimal signal time for each of the one or more predetermined intersection points based on analysis of predicted speed and predicted signal time,
  wherein the optimal speed is different for one or more vehicles of the plurality of vehicles progressing through each distance segment and each predetermined intersection point within the selected path, such that, each of the plurality of vehicles do not arrive at the one or more predetermined intersection points at the same time, and
  wherein the optimal speed and the optimal signal time are determined at predetermined intervals or upon detecting a congestion in the one or more intersection points; and
providing, by the congestion management system, the optimal speed of each of the plurality of vehicles to a vehicle control system associated with corresponding each of the plurality of vehicles and the optimal signal time to a traffic controller associated with corresponding each of the one or more predetermined intersection points, thereby reducing the road congestion.

2. The method as claimed in claim 1, wherein each of the one or more distance segments is configured with at least one of the one or more sensors including an entry sensor, an exit sensor, an intermediate edge sensor and a display unit.

3. The method as claimed in claim 1, wherein the historic traffic data comprises at least one of number of vehicles moving on the path, length of the path, speed of the plurality of vehicles and the signal time of predetermined intersection points along the path.

4. The method as claimed in claim 1, wherein the optimal speed of each of the plurality of vehicles and the optimal signal time of each of the one or more predetermined intersection points are provided to the traffic model for re-training, wherein providing the optimal speed of the plurality of vehicles comprises providing at least one of an audio notification or a visual notification to a driver of corresponding each of the plurality of vehicles when the plurality of vehicles are on the selected path.

5. The method as claimed in claim 1, wherein reducing the road congestion comprises:
  controlling each of the plurality of vehicles in the optimal speed corresponding to each of the plurality of vehicles; and
  maintaining the optimal signal time at each of the one or more predetermined intersection points.

6. The method as claimed in claim 1, wherein the predicted speed and the predicted signal time are analysed using at least one of a multivariate linear regression model or a reinforcement learning model, and wherein the traffic model is re-trained by:
  determining a difference value by comparing the optimal speed of each of the plurality of vehicles with an actual value of each of the plurality of vehicles and the optimal signal time for each of the one or more predetermined intersection points with an actual value of each of the one or more predetermined intersection points; and
  retraining the traffic model when the difference value is greater than a threshold value.

7. A congestion management system for reducing road congestion, the congestion management system comprising:
  a processor; and
  a memory, communicatively coupled to the processor, wherein the memory stores processor-executable instructions, which on execution, cause the processor to:
    identify one or more distance segments and one or more predetermined intersection points along a selected path of road, wherein the selected path is indicative of a signal-free path without any stoppage of the plurality of vehicles within the selected stretch of road;
    receive traffic data related to a plurality of vehicles, for each distance segment and each predetermined intersection point on the selected path of the road, from one or more sensors deployed along the selected path,
      wherein, for each distance segment and each predetermined intersection point,
        the traffic data comprises current location of each vehicle, current speed of each vehicle, number of vehicles entering and crossing the selected path, current signal condition and signal timing at the one or more predetermined intersection points, and number of vehicles waiting at the one or more predetermined intersection points;
    predict a speed of each of the plurality of vehicles across each distance segment within the selected path and a signal time associated with each of the one or more predetermined intersection points, based on the traffic data using a trained traffic model, wherein the traffic model is trained using historic traffic data related to the plurality of vehicles;
    determine an optimal speed for each of the plurality of vehicles and an optimal signal time for each of the one or more predetermined intersection points based on analysis of predicted speed and predicted signal time,
      wherein the optimal speed is different for one or more vehicles of the plurality of vehicles progressing through each distance segment and each predetermined intersection point within the selected path, such that, each of the plurality of vehicles do not arrive at the one or more predetermined intersection points at the same time, and
      wherein the optimal speed and the optimal signal time are determined at predetermined intervals or upon detecting a congestion in the one or more intersection points; and provide the optimal speed of each of the plurality of vehicles to a vehicle control system associated with corresponding each of the plurality of vehicles and the optimal signal time to a traffic controller associated with corresponding each of the one or more predetermined intersection points, thereby reducing the road congestion.

8. The congestion management system as claimed in claim 7, wherein each of the one or more distance segments is configured with at least one of the one or more sensors including an entry sensor, an exit sensor, an intermediate edge sensor and a display unit.

9. The congestion management system as claimed in claim 7, wherein the historic traffic data comprises at least one of number of vehicles moving on the path, length of the path, speed of the plurality of vehicles and the signal time of predetermined intersection points along the path.

10. The congestion management system as claimed in claim 7, wherein the processor provides the optimal speed of each of the plurality of vehicles and the optimal signal time of each of the one or more predetermined intersection points to the traffic model for re-training, wherein the processor further provides the optimal speed of the plurality of vehicles by providing at least one of an audio notification or a visual notification to a driver of corresponding each of the plurality of vehicles when the plurality of vehicles are on the selected path.

11. The congestion management system as claimed in claim 7, wherein the processor reduces the road congestion by:
controlling each of the plurality of vehicles in the optimal speed corresponding to each of the plurality of vehicles; and
maintaining the optimal signal time at each of the one or more predetermined intersection points.

12. The congestion management system as claimed in claim 7, wherein the processor analyses the predicted speed and the predicted signal time using at least one of a multivariate linear regression model or a reinforcement learning model and wherein the traffic model is re-trained by:
determining a difference value by comparing the optimal speed of each of the plurality of vehicles with an actual value of each of the plurality of vehicles and the optimal signal time for each of the one or more predetermined intersection points with an actual value of each of the one or more predetermined intersection points; and
retraining the traffic model when the difference value is greater than a threshold value.

13. A non-transitory computer readable medium including instructions stored thereon that when processed by at least one processor cause a congestion management system to perform operations comprising:
selecting a path by identifying one or more distance segments and one or more predetermined intersection points along a selected stretch of a road, wherein the selected path is indicative of a signal-free path without any stoppage of the plurality of vehicles within the selected stretch of the road;
receiving traffic data related to a plurality of vehicles, for each distance segment and each predetermined intersection point on the selected path of the road, from one or more sensors deployed along the selected path, wherein, for each distance segment and each predetermined intersection point,
the traffic data comprises current location of each vehicle, current speed of each vehicle, number of vehicles entering and crossing the selected path, current signal condition and signal timing at the one or more predetermined intersection points, and number of vehicles waiting at the one or more predetermined intersection points;
predicting a speed of each of the plurality of vehicles across each distance segment within the selected path and a signal time associated with each of the one or more predetermined intersection points, based on the traffic data using a trained traffic model,
wherein the traffic model is trained using historic traffic data related to the plurality of vehicles;
determining an optimal speed for each of the plurality of vehicles and an optimal signal time for each of the one or more predetermined intersection points based on analysis of predicted speed and predicted signal time,
wherein the optimal speed is different for one or more vehicles of the plurality of vehicles progressing through each distance segment and each predetermined intersection point within the selected path, such that, each of the plurality of vehicles do not arrive at the one or more predetermined intersection points at the same time, and
wherein the optimal speed and the optimal signal time are determined at predetermined intervals or upon detecting a congestion in the one or more intersection points; and
providing the optimal speed of each of the plurality of vehicles to a vehicle control system associated with corresponding each of the plurality of vehicles and the optimal signal time to a traffic controller associated with corresponding each of the one or more predetermined intersection points, thereby reducing the road congestion.

14. The non-transitory computer readable medium as claimed in claim 13, wherein each of the one or more distance segments is configured with at least one of the one or more sensors including an entry sensor, an exit sensor, an intermediate edge sensor and a display unit.

15. The non-transitory computer readable medium as claimed in claim 13, wherein the historic traffic data comprises at least one of number of vehicles moving on the path, length of the path, speed of the plurality of vehicles and the signal time of predetermined intersection points along the path.

16. The non-transitory computer readable medium as claimed in claim 13, wherein the instructions cause the processor to provide the optimal speed of each of the plurality of vehicles and the optimal signal time of each of the one or more predetermined intersection points to the traffic model for re-training, wherein the instructions further cause the processor to provide the optimal speed of the plurality of vehicles by providing at least one of an audio notification or a visual notification to a driver of corresponding each of the plurality of vehicles when the plurality of vehicles are on the selected path.

17. The non-transitory computer readable medium as claimed in claim 13, wherein the instructions cause the processor to reduce the road congestion by:
controlling each of the plurality of vehicles in the optimal speed corresponding to each of the plurality of vehicles; and
maintaining the optimal signal time at each of the one or more predetermined intersection points.

18. The non-transitory computer readable medium as claimed in claim 13, wherein the instructions cause the processor to analyse the predicted speed and the predicted signal time using at least one of a multivariate linear regression model or a reinforcement learning model, and wherein the instructions cause the processor to re-train the traffic model by:
- determining a difference value by comparing the optimal speed of each of the plurality of vehicles with an actual value of each of the plurality of vehicles and the optimal signal time for each of the one or more predetermined intersection points with an actual value of each of the one or more predetermined intersection points; and
- retraining the traffic model when the difference value is greater than a threshold value.

\* \* \* \* \*